(12) United States Patent
Riess et al.

(10) Patent No.: US 7,110,923 B2
(45) Date of Patent: Sep. 19, 2006

(54) FAST, BLIND EQUALIZATION TECHNIQUES USING RELIABLE SYMBOLS

(75) Inventors: Eilon Riess, London (GB); Laurence Turner, Bishop's Stortford (GB); Stuart Schwartz, Princeton, NJ (US)

(73) Assignee: Verticalband, Limited, London (GB)

( * ) Notice: Subject to any disclaimer, the term of this patent is extended or adjusted under 35 U.S.C. 154(b) by 873 days.

(21) Appl. No.: 09/899,843

(22) Filed: Jul. 9, 2001

(65) Prior Publication Data
US 2003/0016769 A9 Jan. 23, 2003

Related U.S. Application Data

(63) Continuation-in-part of application No. 09/836,281, filed on Apr. 18, 2001.

(30) Foreign Application Priority Data

| Nov. 4, 1999 | (GB) | 9926167.4 |
| Jul. 10, 2000 | (GB) | 0016938.3 |
| Jul. 10, 2000 | (WO) | 00/02634 |
| Jul. 10, 2000 | (WO) | 00/02648 |

(51) Int. Cl.
*G06F 17/10* (2006.01)

(52) U.S. Cl. .................. 703/2; 375/342; 375/147; 375/283; 375/341

(58) Field of Classification Search .................. 703/2; 375/343, 147, 283, 341, 148, 355, 261, 346; 370/441, 347, 482, 203; 714/776; 725/106
See application file for complete search history.

(56) References Cited

U.S. PATENT DOCUMENTS

| 4,227,152 A | 10/1980 | Godard et al. |
| 4,847,797 A | 7/1989 | Picchi et al. |
| 5,214,675 A | 5/1993 | Mueller et al. |
| 5,229,767 A | 7/1993 | Winter et al. |
| 5,444,712 A | 8/1995 | Betts et al. |
| 5,533,048 A | 7/1996 | Dolan |
| 5,533,050 A | 7/1996 | Isard et al. |
| 5,541,964 A | 7/1996 | Cohen et al. |
| 5,550,924 A | 8/1996 | Helf et al. |
| 5,553,102 A | 9/1996 | Jasper et al. |
| 5,694,423 A | 12/1997 | Larsson et al. |
| 5,742,642 A | 4/1998 | Fertner |
| 5,793,807 A | 8/1998 | Werner et al. |
| 5,809,074 A | 9/1998 | Werner et al. |
| 5,818,876 A | 10/1998 | Love |
| 5,825,832 A | 10/1998 | Benedetto |

(Continued)

FOREIGN PATENT DOCUMENTS

EP    0 625 829 A2    11/1984

(Continued)

OTHER PUBLICATIONS

Robert Hails, Jr., "Technical presentation as part of interview at USPTO, Presentation slides", Dec. 14, 2005.*

(Continued)

*Primary Examiner*—Paul L. Rodriguez
*Assistant Examiner*—Kandasamy Thangavelu
(74) *Attorney, Agent, or Firm*—Kenyon & Kenyon

(57) ABSTRACT

A fast equalization technique is disclosed for systems using high-order constellations where symbols have been corrupted by data correlated noise (ISI). The technique permits ISI estimation to begin immediately upon receipt of captured samples. Training symbols are not required for the operation of the equalization technique. ISI estimation is weighted in accordance to a reliability factor of each captured sample.

70 Claims, 4 Drawing Sheets

U.S. PATENT DOCUMENTS

| | | | |
|---|---|---|---|
| 5,835,731 | A | 11/1998 | Werner et al. |
| 5,867,539 | A | 2/1999 | Koslov |
| 5,887,035 | A | 3/1999 | Molnar |
| 5,901,185 | A | 5/1999 | Hassan |
| 5,940,440 | A | 8/1999 | Werner et al. |
| 6,075,816 | A | 6/2000 | Werner et al. |
| 6,115,433 | A | 9/2000 | de Lantremange |
| 6,259,743 | B1 | 7/2001 | Garth |
| 6,272,171 | B1 | 8/2001 | Okunev et al. |
| 6,275,990 | B1* | 8/2001 | Dapper et al. ............... 725/106 |
| 6,278,730 | B1 | 8/2001 | Tsui et al. |
| 6,304,593 | B1 | 10/2001 | Alouini et al. |
| 6,304,594 | B1 | 10/2001 | Salinger |
| 6,310,909 | B1 | 10/2001 | Jones |
| 6,347,125 | B1 | 2/2002 | Dent |
| 6,421,394 | B1 | 7/2002 | Tanrikulu |
| 6,426,972 | B1 | 7/2002 | Endres et al. |
| 6,438,174 | B1 | 8/2002 | Isaksson et al. |
| 6,456,669 | B1* | 9/2002 | Sakoda ........................ 375/283 |
| 6,477,215 | B1 | 11/2002 | Temerinac |
| 6,487,244 | B1 | 11/2002 | Betts |
| 6,490,270 | B1 | 12/2002 | Krishnamoorthy et al. |
| 6,549,584 | B1 | 4/2003 | Gatherer et al. |
| 6,556,634 | B1* | 4/2003 | Dent .......................... 375/343 |
| 6,560,272 | B1* | 5/2003 | Komatsu ..................... 375/147 |
| 6,567,475 | B1 | 5/2003 | Dent et al. |
| 6,577,683 | B1 | 6/2003 | Waldron et al. |
| 6,581,179 | B1* | 6/2003 | Hassan ....................... 714/776 |
| 6,603,752 | B1 | 8/2003 | Saifuddin et al. |
| 6,618,451 | B1* | 9/2003 | Gonikberg .................. 375/341 |
| 6,661,837 | B1 | 12/2003 | Abdelilah et al. |
| 6,665,308 | B1* | 12/2003 | Rakib et al. ................. 370/441 |
| 6,704,324 | B1 | 3/2004 | Holmquist |
| 6,717,934 | B1 | 4/2004 | Kaasila et al. |
| 6,804,267 | B1 | 10/2004 | Long et al. |
| 6,842,495 | B1 | 1/2005 | Jaffe et al. |
| 2004/0042566 | A1* | 3/2004 | Eidson et al. ............... 375/341 |
| 2004/0179578 | A1* | 9/2004 | Ben Rached et al. ....... 375/130 |

FOREIGN PATENT DOCUMENTS

| | | |
|---|---|---|
| EP | 0 845 891 A2 | 6/1998 |
| EP | 1 024 631 A1 | 8/2000 |
| WO | WO 99/23795 | 5/1999 |

OTHER PUBLICATIONS

Kwon et al, "A Blind Equalization with the Variable Decision Region", *Pers. Indoor and Mobile R. Comm.*, vol. 2, pp. 322-326 (Sep. 1997).

Lee et al, "A Decision-Directed Blind Equalization with the Error Variance Estimation", vol. 1, pp. 99-103, IEEE, (Oct. 1997).

Lee et al, "Convergence Analysis of the Stop-and-Go Blind Equalization Algorithm", *IEEE Trans. Comm.*, vol. 47, No. 2, pp. 177-180, (Feb. 1999).

Xu et al, "An Improved Decision-Directed Equalization Algorithm for MQAM Modulation", *Chinese Journal of Electronics*, vol. 9, pp. 45-51 (1997).

Xu et al, "New Decision-Directed Equalization Algorithm for QAM Communication Systems", *IEEE Global Telecommunications Conference 1996*, vol. 2, pp. 1330-1334, (1996).

Werner et al, "Blind Equalization for Broadband Access", *IEEE Comm.*, vol. 37, No. 4, pp. 87-93, (Apr. 1999).

Lee et al, "Joint Blind Equalization with a Shell Partition-Based CMA for QAM Signal Constellations", IEEE Int'l. Conference on Acoustics, Speech, and Signal Processing, IEEE Computer Society Press, pp. 2513-2516, (Apr. 21-24, 1997).

Tseng et al, "A Stop-and-Go Dual-Mode Algorithm for Blind Equalization", Globecom 96, vol. 2, pp. 1427-1431, (Nov. 18-22, 2996).

Garth et al, "Blind Equalization Algorithms with Automatic Constellation Phase Recovery for Dual-Mode CAP-QAM Reception", 1999 IEEE Int'l. Conference on Communications, vol. 3, pp. 1531-1536, (Jun. 6-10, 1999).

Jablon, Neil K., "Joint Blind Equalization, Carrier Recovery, and Timing Recovery for High-Order QAM Signal Constellations", *IEEE Transactions on Signal Processing*, pp. 1383-1397, vol. 40, No. 6, Jun. 1992.

Johnson et al, "Blind Equalization Using the Constant Modulus Criterion: A Review", *Proceedings of the IEEE*, pp. 1927-1950, vol. 86, No. 10, Oct. 1998.

Yang et al, "The Multimodulus Blind Equalization Algorithm", 1997 13th Int'l Conference on Digital Signal Processing Proceedings, DSP 97, pp. DSP 97-127 through DSP 97-130, vol. 1 of 2, Jul. 2-4, 1997, Santorini, Hellas (Greece).

Treichler et al, "Practical Blind Demodulations for High-Order QAM Signals", *Proceedings of the IEEE*, Special Issue on Blind Systems Identification and Estimation, edited by R. Liu and L. Tong, pp. 1907-1926, vol. 86, No. 10, Oct. 1998.

Gertsman et al, "Symbol-by-Symbol MAP Demodulation of CPM and PSK Signals on Rayleigh Flat-Fading Channels", *IEEE Transactions on Communications*, pp. 788-799, vol. 45, No. 7, Jul. 1997.

Benedetto et al, "A Soft-Input Soft-Output APP Module for Iterative Decoding of Concatenated Codes", *IEEE Communications Letters*, pp. 22-24, vol. 1, No. 1, Jan. 1997.

Kenington, P.B., "Emerging Technologies for Software Radio", *Electronics Communication Engineering Journal*, pp. 69-83, vol. 11, No. 2, Apr. 1999.

Porat et al, "Blind Equalization of Digital Communication Channels Using High-Order Moments", *IEEE Transactions on Signal Processing*, vol. 39, No. 2, Feb. 1991.

Bahl et al, "Optimal Decoding of Linear Codes for Minimizing Symbol Error Rate", *IEEE Transactions on Information Theory*, pp. 284-287, vol. IT-20, No. 2, Mar. 1974.

Sato, Yoichi, "A Method of Self-Recovering Equalization of Multilevel Amplitude-Modulation Systems", *IEEE Transactions on Communications*, vol. COM-23, No. 6, Jun. 1975.

Viterbi et al, *Principles of Digital Communication and Coding*, Chapter 2, pp. 47-127, McGraw-Hill Book Company, 1979.

Proakis, John G., *Digital Communications*, Chapters 5, 6, 10, 11, Third Edition, McGraw-Hill, Inc., 1983.

Godard, Dominique N., "Self-Recovering Equalization and Carrier Tracking in Two-Dimensional Data Communication Systems", *IEEE Transactions on Communications*, vol. Com-28, No. 11, pp. 1867-1875, Nov. 1980.

Kong et al, "Detection of Amplitude-Phase Modulated Signals Over Frequency Nonselective Rayleigh Fading Channels with Adaptive Symbol-Aided Channel Estimation" IEEE Vehicular Technology Conference, Atlanta, Georgia, USA, IEEE, Conf. 46, Apr. 28-May 1, 1996, ISBN 0-7803-3158-3.

Hoeher, Peter, "TCM on Frequency-Selective Fading Channels: A Comparison of Soft-Output Probabilistic Equalizers", Processings of the Global Telecommunications Conference and Exhibition (GLOBECOM), USA, New York, IEEE, Dec. 2, 1990, ISBN 0-87942-632-2.

Kong et al, "Adaptive MLSE of QAM Signals over Frequency Nonselective Rayleigh Fading Channels", IEE Proceedings: Communications, Great Britain, Institution of Electrical Engineers, vol. 145, No. 6, Dec. 1998, ISSN 1350-2425.

Hart et al, "Maximum-Likelihood Synchronization, Equalization, and Sequence Estimation for Unknown Time-Varying Frequence-Selective Rician Channels", IEEE Transactions on Communications, USA, IEEE Inc., New York, vol. 46, No. 2, Feb. 1, 1998, ISSN 0090-6778.

* cited by examiner

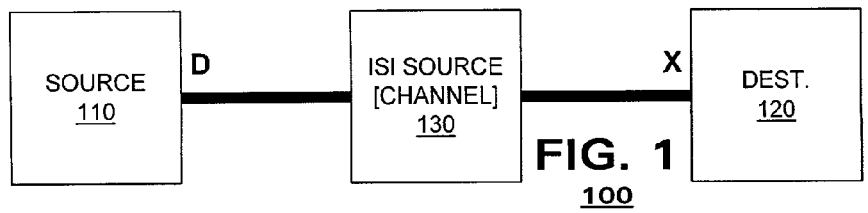
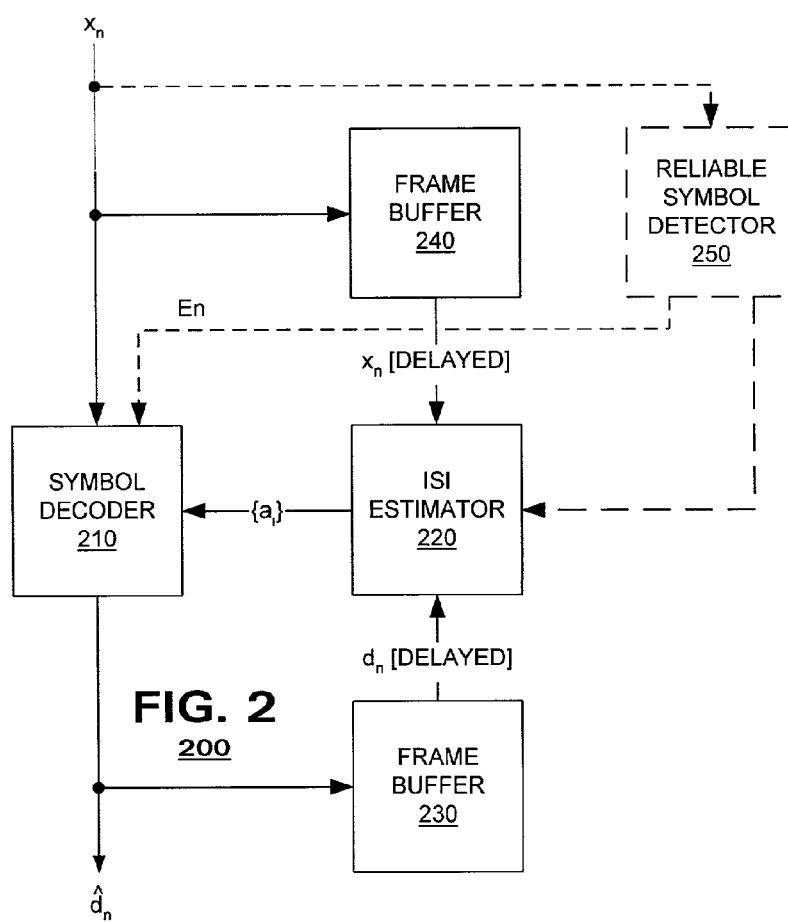

600

700

FAST, BLIND EQUALIZATION TECHNIQUES USING RELIABLE SYMBOLS

CROSS-REFERENCE TO RELATED APPLICATIONS

This application is a continuation-in-part of the following applications: U.S. patent application Ser. No. 09/836,281, filed Apr. 18, 2001, WIPO 00/02634, filed Jul. 10, 2000 (which benefits from the priority of UK application 16938.3, also filed Jul. 10, 2000), and WIPO 00/02648, filed Jul. 10, 2000 (which benefits from the priority of UK application 9926167.4, filed Nov. 4, 1999), the disclosures of which is incorporated herein by reference. Certain claims may benefit from the priority of these applications.

BACKGROUND

The present invention relates to an equalization technique useful for transmitting symbols of high-order constellations that are subject to corruption by inter-symbol interference and other data correlated noise (collectively, "ISI"). ISI refers to a variety of phenomena in data processing systems in which a data signal interferes with itself at a destination. The present invention also relates to the use of reliable symbols to determine values of source symbols that are corrupted by ISI. The present invention finds particular application in systems where source symbols are members of high-order constellations. Previously, such systems have required the use of training symbols for operation in the presence of real-world ISI phenomenon.

FIG. 1 illustrates an exemplary data processing system 100 in which ISI may occur. A source 110 may generate a data signal D (herein, a "source data signal"). When delivered to a destination 120 as a received signal X, the source data signal D may be corrupted by ISI sources within a channel 130. For example, multiple copies of a single data signal D may be captured at the destination 120, each copy being received with an unknown time shift and gain with respect to the other copies. Further, the time shifts and gains may vary over time.

ISI phenomena may be modeled mathematically. In the case where the data signal D is populated by a number of data symbols $d_n$, captured signals $x_n$ at the destination 120 may be represented as:

$$x_n = a_0 \cdot d_n + f(d_{n-K_2}, \ldots, d_{n-1}, d_{n+1}, \ldots, d_{n+K_1}) + \omega_n \quad (1)$$

where $a_0$ represents a gain factor associated with the channel 130, $f(d_{n-K_2}, \ldots d_{n+K_1})$ is a functional representation that relates the ISI to the symbols, $d_{n-K_2}, \ldots d_{n+K_1}$, causing ISI corruption and $\omega_n$ represents corruption from other sources. In linear systems, Equation 1 may reduce to:

$$x_n = d_n + \sum_{\substack{i=-K_1 \\ i \neq 0}}^{K_2} a_i \cdot d_{n-i} + \omega_n, \quad (2)$$

where $a_{-k_1}, \ldots a_{k_2}$ represent impulse response of the channel. In accordance to common practice, the values $a_i$ have been normalized by the value of $a_0$ in Equation 2.

ISI is seen as a serious impediment to the use of high-order constellations for data processing systems. A "constellation" is a set of unique values (constellation points) that may represent data symbols. Higher order constellations define a greater number of constellation points than lower order constellations. For example, symbols from a binary constellation, one having only two constellation points, can represent only a single digital bit per symbol. By contrast, symbols from an eight-point constellation, a sixteen-point constellation or a 256-point constellation can represent three, four or eight digital bits per symbol. At a common symbol rate, these higher order constellations can yield higher data throughput than lower order constellations.

Unfortunately, blind equalization (equalization without either an initial training sequence, or 'refresher' training sequences) is very hard to achieve with higher order constellations. The detrimental effects of ISI increase with increasing constellation order due to a greater contribution from the $$\sum_{\substack{i=-K_1 \\ i \neq 0}}^{K_2} a_i \cdot d_{n-i}$$

term of Equation 2.

The inventors' co-pending patent application entitled, "Reliable Symbols as a Means of Improving the Performance of Information Transmission Systems," filed Apr. 18, 2001 having Ser. No. 09/836,281, discloses several techniques for blind estimation of ISI in transmission systems using high-order constellations. The invention described herein and the work presented in the inventors' co-pending foreign applications are believed to be the first practical blind equalization techniques suitable for high-order constellation data systems. The inventors believe that the disclosures herein and the methods described in the co-pending patent applications enable an increased number of reliable symbols to be obtained from captured samples and that this increases the rate and effectiveness of equalization.

BRIEF DESCRIPTION OF THE DRAWINGS

FIG. 1 illustrates an exemplary data processing system in which ISI may occur.

FIG. 2 is a block diagram of an equalizer according to an embodiment of the present invention.

DETAILED DESCRIPTION

Figure 3:
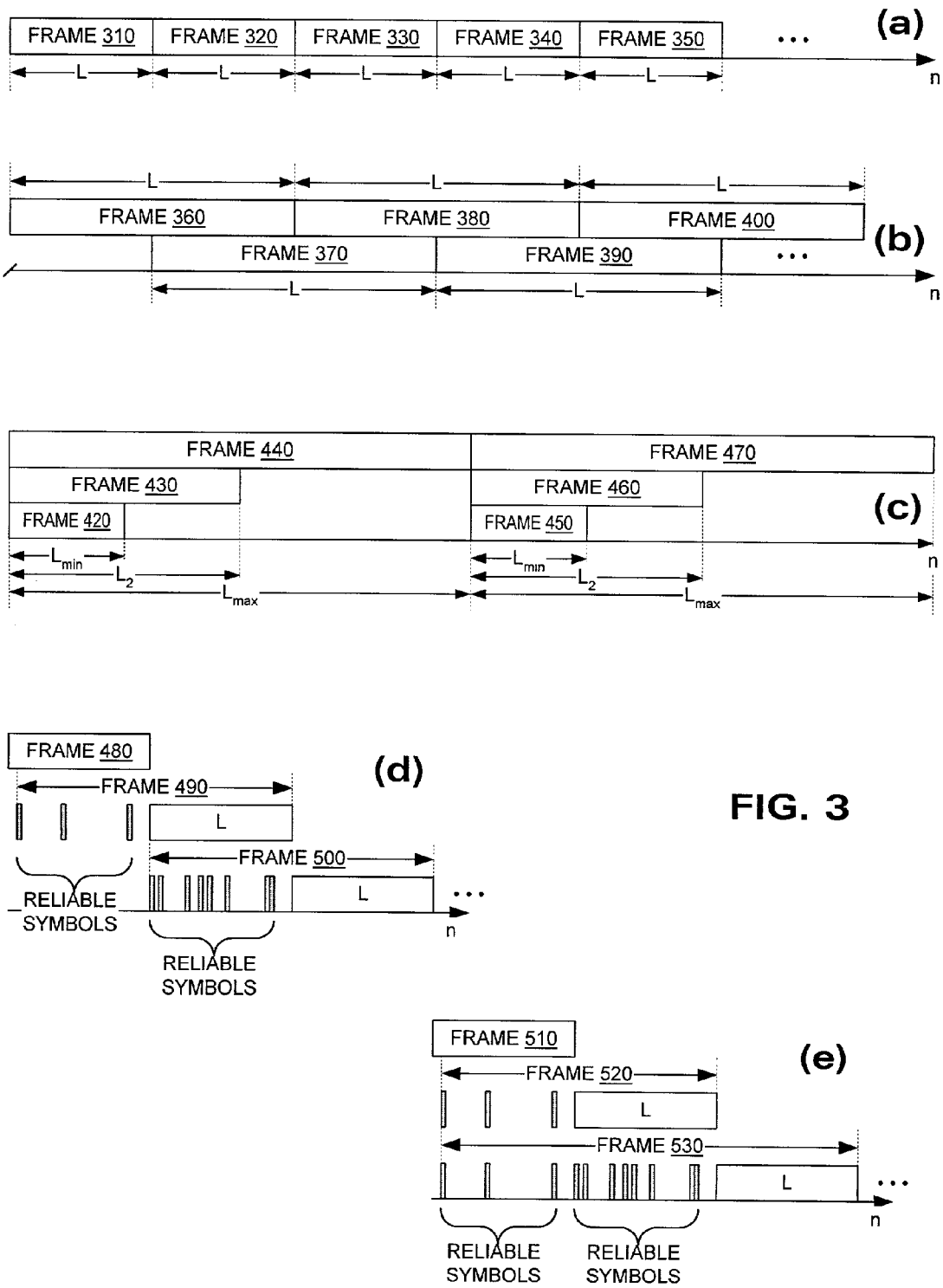
FIG. 3 illustrates several embodiments of framing according to the present invention.

Embodiments of the present invention provide fast equalization techniques for systems using high-order constellations where symbols have been corrupted by ISI. The technique allows ISI estimation to begin immediately upon receipt of captured samples. ISI estimation is weighted according to a reliability factor of each captured sample.

FIG. 2 is a block diagram of an equalizer 200 according to an embodiment of the present invention. The equalizer 200 may include a symbol decoder 210, an ISI estimator 220 and a pair of buffers 230, 240. The symbol decoder 210 may estimate decoded symbols $\hat{d}_n$ from a sequence of captured samples $x_n$ based on a current estimate of ISI coefficients (labeled $\{\hat{a}_i\}$ in FIG. 2). Decoded symbols $\hat{d}_n$ may be stored in a first buffer 230; captured samples $x_n$ may be stored in a second buffer 240. The ISI estimator 220 may generate new estimates of the ISI coefficients {$\hat{a}_i$} based on the symbols $\hat{d}_n$ and samples $x_n$ from the buffers 230, 240.

The equalizer 200 shown in FIG. 2 advantageously permits decoding to occur immediately upon receipt of captured samples xn even before an accurate estimate of the ISI coefficients {$\hat{a}_i$} are available. Thus, the decoded symbols $\hat{d}_n$ output by the symbol decoder 210 may have large error initially. Over time, however, as more decoded symbols $\hat{d}_n$ become available, the ISI estimator 220 may develop increasingly improved estimates of the ISI coefficients and improve the accuracy of the decoded symbols $\hat{d}_n$ estimated by the symbol decoder 210.

ISI Estimation Using Reliability Weighting

Having estimated decoded symbols $\hat{d}_n$ from the captured samples $x_n$, the ISI estimator 220 may revise ISI coefficient estimates. To simplify the nomenclature herein, consider a case where the buffers 240, 230 respectively store a predetermined number L of samples $x_n$ and decoded symbols $d_n$ (n=1 to L).

In an embodiment, the ISI estimator 220 may employ a least squares estimation to update the ISI coefficients according to:

$$\{\hat{a}\} = (\underline{H}^T \underline{W} \underline{H})^{-1} \underline{H}^T \underline{W} \underline{\Delta} \quad (3)$$

where: {$\hat{a}$} is a vector of estimated normalized ISI coefficients $\underline{\Delta}$ is a vector that contains elements $\Delta_n = z_n - \hat{d}_n$, representing the difference between the received samples $x_n$ and the related decisions $\hat{d}_n$, $\underline{H}$ is an L×K matrix containing surrounding symbol estimates, and $\underline{W}$ is an L×L diagonal weight matrix having weights $w_{n,n}$ that are derived from a reliability factor of an associated captured sample $x_n$ ($w_{i,j}=0$ for all i≠j). The weight may increase or remain constant with decreasing reliability factor.

In an embodiment, the $\underline{H}$ matrix may be populated by symbol estimates obtained from the symbol decoder. It may be constructed as an L×K matrix in which each of the L rows contains symbol estimates surrounding the estimated symbol to which the row refers. For example, an $i^{th}$ row may relate to a symbol estimate $\hat{d}_1$. In a simple embodiment, where ISI is known to occur from symbols on only one side of the decoded symbol $\hat{d}_i$, the $i^{th}$ row may contain the symbol estimates $\underline{H}_i = \{\hat{d}_{1-K}, \hat{d}_{i-(K-1)}, \ldots, \hat{d}_{i-1}\}$. In the more general case, where ISI may occur from symbols on both sides of the decoded symbol $\hat{d}_i$, the $i^{th}$ row ($\underline{H}_i$) may contain the symbol estimates $\underline{H}_i = \{\hat{d}_{i-K_2}, \ldots, \hat{d}_{i-1}, \hat{d}_{i+1}, \ldots, \hat{d}_{i+K_1}\}$. K, the width of the $\underline{H}$ matrix, may be determined by the number of adjacent symbols that are expected to contribute to ISI corruption.

During ISI estimation, different samples $x_n$ may be assigned relative weights based upon associated reliability factors $R(x_n)$ of the samples. In a first embodiment, a weight $w_{n,n}$ may be assigned according to a binary weighting scheme. If the reliability factor of a sample is equal to or less than a predetermined threshold, the weight $w_{n,n}$ may be assigned a first value, otherwise the weight may be a second value. For example:

$$w_{n,n} = \begin{cases} 1: & \text{if } R(x_n) \leq d_{\lim} \\ 0: & \text{otherwise} \end{cases} \quad (4)$$

In this embodiment, a sample $x_n$ contributes to ISI estimation if and only if it is a reliable symbol.

Alternatively, all samples may contribute to ISI estimation, weighted according to their reliability factors. For example:

$$w_{n,n} \propto \frac{1}{R(x_n)} \quad (5)$$

In this embodiment, even those samples $x_n$ that do not meet the criterion for reliability may contribute to the ISI estimation. However, the contribution of samples with very high reliability factors will be much lower than samples with very low reliability factors. In other words, reliable symbols have greater contribution to ISI estimation than samples that are non-reliable.

In another embodiment, all samples may be permitted to contribute to the ISI estimate but reliable symbols may be given a very large weight in comparison to non-reliable samples. For example:

$$w_{n,n} = \begin{cases} 1: & R(x_n) \leq d_{\lim} \\ \frac{f}{R(x_n)}: & \text{else} \end{cases} \quad (6)$$

where f is a ceiling factor that prevents $$\frac{f}{R(x_n)}$$

from exceeding 1 for all non-reliable samples. In this embodiment, any sample that meets the criterion for reliability may be assigned a predetermined weighting value ("1" in the example of Equation 6). All reliable symbols would be equally weighted in the ISI estimation. Any sample that fails the criterion for reliability may be assigned a weight that is proportional to its calculated reliability.

Calculation of the Reliability Factor $R(x_n)$

The inventors' prior application describes several alternative techniques for calculating the reliability factor R of a sample $x_n$. They include:

$$R(x_n) = \sum_{\substack{i=-K_1 \\ i \neq 0}}^{K_2} |x_{n-i}| \cdot c_i \quad (7)$$

where $K_1$, $K_2$ represent the numbers of samples adjacent to sample $x_n$ that may contribute to ISI corruption. The values $c_i$ are constants representing any priori knowledge of the ISI effect that may be available. Generally, if nothing is known about the ISI, then the $c_i$'s may all be set equal to 1. In other situations, additional information as to the nature of the channel 130 may be known and the $c_i$'s may be given values reflecting this information.

Where samples on only one side of a sample $x_n$ contribute to the ISI effect, the reliability factor of the sample $x_n$ may be calculated according to:

$$R(x_n) = \sum_{i=1}^{K} |x_{n-i}| \cdot c_i. \quad (8)$$

where $K=K_2$ in Equation (2). In respect to the forgoing reliability factors (Equations (7) and (8)) the $x_n$'s may be real for one-dimensional signal structures or complex for two-dimensional signal structures.

For systems using two-dimensional constellations, such as QAM constellations, the reliability factor may be determined using:

$$R(x_n) = \sum_{\substack{i=-K_1 \\ i \neq 0}}^{K_2} \sqrt{x_{1_{n-1}}^2 + x_{2_{n-1}}^2} \cdot c_i \quad (9)$$

where $x_{1_{n-i}}$ and $x_{2_{n-i}}$ respectively represent values of $x_{n-1}$ in the first and second dimensions.

Alternately, the reliability factor R may be calculated from values, $\hat{d}_n$, of the decoded symbols at the output from the symbol decoder 210. In this embodiment, the evaluation of Equations 7 to 9 may be carried out as follows:

$$R(x_n) = \sum_{\substack{i=-K_1 \\ i \neq 0}}^{K_2} |\hat{d}_{n-i}| \cdot c_i, \quad (10)$$

$$R(x_n) = \sum_{i=i_1}^{K} |\hat{d}_{n-i}| \cdot c_i, \text{ and} \quad (11)$$

$$R(x_n) = \sum_{\substack{i=-K_1 \\ i \neq 0}}^{K_2} \sqrt{\hat{d}_{1_{n-i}}^2 + \hat{d}_{2_{n-i}}^2} \cdot c_i \quad (12)$$

respectively. In Equation 12, the parameters $\hat{d}_{1_{n-i}}$ and $\hat{d}_{2_{n-i}}$ respectively represent values of $\hat{d}_{n-i}$ in first and second dimensions.

The predetermined threshold $d_{1im}$ may be determined based on the applications for which the identification method is to be used. In one embodiment, the threshold may be set to the value $d_{1im} = (K_1 + K_2) \cdot d_{min}$ where $d_{min}$ is half the distance between two constellation points that are closest together. This threshold is appropriate for the case where $$\frac{1}{|a_0|} \sum_{\substack{i=-K_1 \\ i \neq 0}}^{K_2} |a_i| \leq 1.$$

Experiments have shown, however, that operation can be maintained using the same threshold when $$\frac{1}{|a_0|} \sum_{\substack{i=-K_1 \\ i \neq 0}}^{K_2} |a_i| \leq 1.4.$$

The threshold $d_{1im}$ also may vary over time. If the predetermined threshold is increased, then an increased number of samples will be accepted as reliable symbols though, of course, all of these symbols will not be of the same reliability. Similarly, by decreasing the threshold $d_{1im}$, the number of samples that are designated as reliable symbols will decrease. These symbols will be those symbols with lower reliability factors. During operation of a reliable symbol detection method, the threshold $d_{1im}$ may be varied to maintain a rate of detected reliable symbols at a desired value. For example, if a rate of detected symbols falls below a first rate threshold, the $d_{1im}$ value may be increased. Or, if the rate of detected symbols exceeds a second rate threshold, the $d_{1im}$ value may be decreased.

In a case where captured samples $x_n$ may suffer a carrier phase rotation with respect to the source symbols $d_n$, the threshold $d_{1im}$ may be set according to half the width of an annular constellation ring in which the captured sample $x_n$ is observed. Further details of the constellation rings are available in the inventors' earlier-filed patent applications and are incorporated herein by reference.

Framing

The foregoing discussion has described ISI estimation from a predetermined number L of samples $x_n$ and $\hat{d}_n$. This predetermined number L implies the use of frames. While the adaptation process described above may be performed on a frame-by-frame basis, additional benefits may be obtained with more sophisticated use of these frames.

FIG. 3 illustrates several framing schemes applicable for use with the present invention. In a first embodiment, shown in FIG. 3 (a), frames of uniform length L may be processed sequentially. That is, ISI estimation may commence using a first frame 310 of L samples $x_n$ and symbols $\hat{d}_n$. Following processing of the first frame 310, the ISI estimation may continue using a second frame 320 of L samples $x_n$ and symbols $\hat{d}_n$. The samples $x_n$ and symbols $\hat{d}_n$ from the first frame 310 may be omitted from the adaptation analysis of the second frame 320. Additional frames 330–350 may be processed sequentially for as long as captured samples $x_n$ are available to the equalizer 200. The embodiment of FIG. 3(a) may be advantageous for use in applications where ISI coefficients are expected to fluctuate over time.

A second embodiment, shown in FIG. 3(b), may employ overlapping frames of uniform length L. ISI estimation may commence using a first frame 360 of L samples $x_n$ and symbols $\hat{d}_n$. Following processing of the first frame 360, the ISI estimation may continue using a second frame 370 of L samples $x_n$ and symbols $\hat{d}_n$. In this embodiment, certain samples $x_n$ and symbols $\hat{d}_n$ from the first frame 360 may be members of the second frame 370. Thus, these samples $x_n$ and symbols $\hat{d}_n$ may be used for ISI estimation for multiple frames. Additional frames 380–410 may be processed using similar techniques. Thus, for the third frame 380, certain samples $x_n$ and symbols $\hat{d}_n$ from the second frame 370 may be retained for the ISI estimation process. The embodiment of FIG. 3 (b) may provide a smoother estimate of the fluctuating ISI coefficients.

A third embodiment, shown in FIG. 3 (c), may employ a series of frames having frame lengths that increase from a minimum frame length $L_{min}$ to a maximum frame length $L_{max}$. In this embodiment, ISI estimation may commence using a first frame 420 of $L_{min}$ samples $x_n$ and symbols dn. Thereafter, ISI estimation may continue using a second, larger frame 430 of $L_2$ samples $x_n$ and symbols $\hat{d}_n$. The second frame may include samples $x_n$ and symbols $\hat{d}_n$ from the first frame. Following processing of the second frame 430, ISI estimation may be performed on successively larger frames of samples $x_n$ and symbols $\hat{d}_n$ until a frame 440 of maximum length, $L_{max}$, is processed. In an embodiment, following processing of the largest frame 440, the ISI estimator 230 may process a new frame 450 of minimum length $L_{min}$ and repeat the sequence of frames 440–460 having progressively larger lengths as described above. Alternatively, having processed a frame 440 of maximum length $L_{max}$ the ISI estimator 230 may continue to process new frames of the maximum length 460 sequentially in a manner analogous to that shown in FIG. 3 (*a*).

FIG. 3 (*d*) illustrates yet another embodiment of framing. In this embodiment, ISI estimation may commence using a frame 480 of L samples $x_n$ and symbols $\hat{d}_n$. Thereafter, ISI estimation may continue using a second frame 490 of samples $x_n$ and symbols $\hat{d}_n$. This second frame 490 may include a new set of L samples $x_n$ and symbols $\hat{d}_n$ and any samples $x_n$ and symbols from the first frame 480 identified as being reliable symbols. In the example of FIG. 3 (*d*), the second frame 490 is shown as including three reliable symbols from the first frame 480. Thereafter, processing may advance to a third frame 500 which might include a new set of L samples and symbols as well as any samples and symbols from the second frame 490 that are deemed to be reliable. Of course, there is no requirement that a frame 500 include reliable symbols only from the immediately preceding frames of samples. In alternate embodiments, a frame may include reliable symbols from one or more preceding frames of samples; this embodiment is illustrated in FIG. 3 (*e*).

In another embodiment, adaptation may occur on a sample-by-sample basis. In this case, "frames" may have an overlap of L–1 samples.

Identification of reliable symbols may occur according to any of the techniques described in the inventors' prior application. For example, if the reliability factor $R(x_n)$ is less than or equal to a limit value $d_{1im}$, the sample $x_n$ may be a reliable symbol. In the equalizer 200, reliability factors may be calculated according to any of the techniques of Equations 7–12 and, in appropriate embodiments, of Equations 14–16 below.

Alternative Equalizer Structures Based on Reliable Symbols

Returning to FIG. 2, an embodiment of the equalizer 200 optionally may include a reliable symbol detector 250 (shown in phantom) to enable the symbol decoder 210. The reliable symbol detector 250 may accept input samples $x_n$ and identify which of them, if any, have reliability factors sufficient to qualify them as reliable symbols. In this embodiment, the reliable symbol detector 250 may generate a control signal En that enables the symbol decoder 210 upon detection of a first reliable symbol. In this embodiment, the reliable symbol detector 250 inhibits operation of the equalizer 200 until a first reliable symbol is detected from the sequence X of captured samples.

Although the foregoing embodiments have described the equalizer 200 as employing a purely blind equalization process, the present invention does not preclude use of training symbols. Training symbols may be a transmitted to provide at the destination 120 a number of received samples that can be used as alternatives to reliable symbols. Following receipt of the training symbol samples, the equalizer 200 may process other samples $x_n$ in a blind fashion as described in the foregoing embodiments. This embodiment represents an improvement over other equalizers for high-order constellations because, even though training symbols would be used in the present invention, the training symbols would be of reduced number as compared with known systems. Such a short training sequence may not be of sufficient length to allow complete equalization of the channel but may allow ISI adaptation to begin. In such an embodiment, if successive groups of training symbols are used the period between groups of training symbols may be long compared to the dynamics of the channel and the present invention would continue to equalize the channel during the period between training samples.

Figure 4:
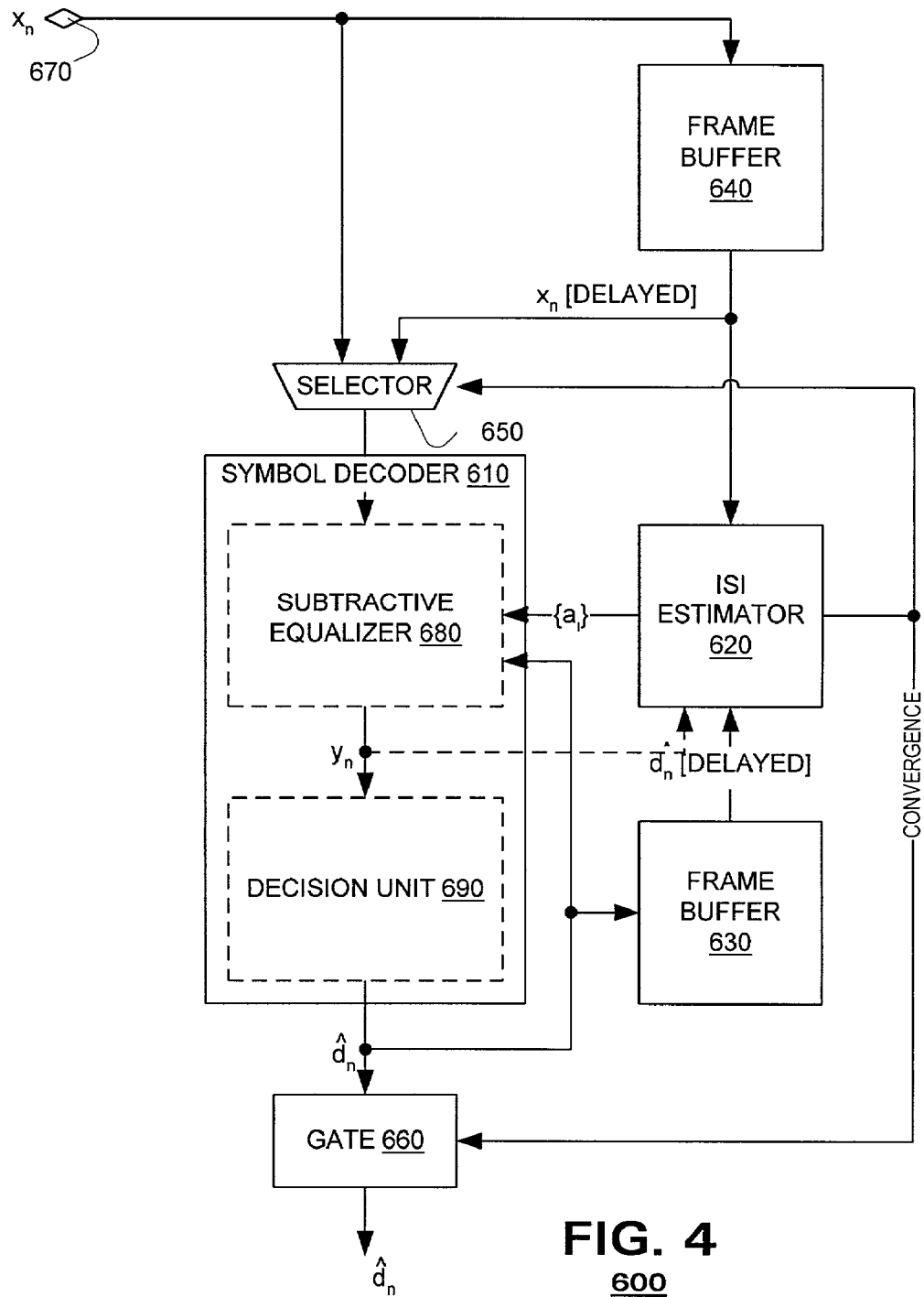
FIG. 4 is a block diagram of an equalizer according to another embodiment of the present invention.

FIG. 4 is a block diagram of an equalizer system 600 according to another embodiment of the present invention. In this embodiment, the equalizer system 600 may perform ISI estimation without outputting estimated symbols $\hat{d}_n$ from the equalizer until the ISI estimation reaches a convergence, that is until ISI estimation error is below a predetermined threshold. This embodiment may include a symbol decoder 610, an ISI estimator 620 and a pair of buffers 630, 640 that operate in accordance with the embodiments described above. For example, the ISI estimator 620 may apply adaptation weights $w_{n,n}$ to sample-symbol pairs based on reliability factors of the samples/symbols as described above. The equalizer 600 also may include a selector 650 and a gate 660.

According to this embodiment, the selector may be connected both to an original input 670 of the captured samples $x_n$ and to the buffer 640. The selector 650 may be controlled by a CONVERGENCE signal output from the ISI estimator 620. When the CONVERGENCE signal indicates that the ISI estimation has not converged, the selector 650 may pass samples $x_n$ from the input 670 to the symbol decoder 610. When the ISI signal indicates that the ISI estimation has converged, the selector 650 may pass samples $x_n$ from buffer 640 to the symbol decoder 610.

The gate 660 may be coupled to an output of the symbol decoder 610 and also may be controlled by the state of the CONVERGENCE signal. When ISI estimation has not yet converged, the gate 660 may be rendered non-transmissive and may block decoded symbols $\hat{d}_n$ from being output from the equalizer 600. When the ISI estimation does converge and the symbol decoder 610 decodes captured samples $x_n$ from the buffer 640, the gate 660 may become transmissive and the equalizer 600 may output the decoded symbols $\hat{d}_n$.

This embodiment may be advantageous for use in applications where ISI is not expected to fluctuate wildly over the course of several frames. If, for example, it takes 20 frames for an ISI estimation to converge and if it is expected that the estimated ISI coefficients govern the first frame of captured samples, then all 20 frames may be decoded using the ISI estimate, once the estimate has converged. In this case, these 20 frames may be retrieved from the buffer 640 and decoded. The decoded symbols that are obtained from the converged ISI estimate are likely to be more accurate than the decoded symbols that were generated by the symbol decoder 610 prior to convergence. Of course, after the 20 exemplary frames are decoded, the selector 650 may switch back to the input 670 and permit the symbol decoder 610 to decode newly received samples $x_n$.

The Symbol Decoder

The Subtractive Equalizer

Several embodiments of symbol decoders 210, 610 may be employed for use in the equalizers of FIGS. 2 and 4. A first embodiment is shown in phantom in FIG. 4. The symbol decoder 610 may include a subtractive equalizer 680 and a hard decision unit 690. In one embodiment the subtractive equalizer 680 may generate a re-scattered sample $y_n$ from the captured sample $x_n$ according to:

$$y_n = x_n - \sum_{i=1}^{K_2} \hat{a}_i \cdot \hat{d}_{n-i} \tag{13}$$

where coefficients $\hat{a}_i$ represent a current ISI estimate and $\hat{d}_{n-1}$ represent previously decoded symbols. Initially, for the first frame, the ISI estimate may be set arbitrarily, such as $\hat{a}_i = 0$ for all i. Also, the $\hat{d}_{n-i}$ that antedates the first captured sample may be set arbitrarily, such as $\hat{d}_{n-i} \equiv 1$. The hard decision unit 690 may generate decoded symbols $\hat{d}_n$ from respective re-scattered samples $y_n$. For example, the hard decision unit 690 may generate a decoded symbol $\hat{d}_n$ as the constellation point closest to the re-scattered sample $y_n$.

In an embodiment where the symbol decoder 610 includes a subtractive equalizer 680 and a hard decision unit 690, ISI estimation may be performed using the re-scattered samples $y_n$ rather than the estimated symbols $\hat{d}_n$. ISI coefficients may be estimated according to the techniques disclosed in Equation 3 but, in this embodiment, the vector $\underline{\Delta}$ may represent differences between the received samples $x_n$ and the re-scattered samples $y_n$ ($\Delta_n = \{x_n - y_n\}$) and the matrix $\underline{H}$ may contain surrounding re-scattered samples. In this embodiment, re-scattered samples $y_n$ from the subtractive equalizer 680 may be input to the ISI estimator 620 instead of the estimated symbols $\hat{d}_n$ (shown in phantom in FIG. 4).

In this embodiment, the $\underline{H}$ matrix may be populated by re-scattered samples obtained from the subtractive equalizer. Each row of the matrix may contain re-scattered samples surrounding the sample to which the row refers. For example, an $i^{th}$ row may relate to a symbol estimate yj. In a simple embodiment, where ISI is known to occur from symbols on only one side of the rescattered sample $y_i$, the $i^{th}$ row may contain the rescattered samples $\underline{H}_i = \{y_{i-K}, y_{i-(K-1)}, \ldots, y_{i-1}\}$. In the more general case, where ISI may occur from symbols on both sides of the rescattered sample $y_i$, the $i^{th}$ row may contain the rescattered samples $\underline{H}_i = \{y_{i-K_2}, \ldots, y_{i-1}, y_{i+1}, \ldots, y_{i+K_1}\}$. K, the width of the $\underline{H}$ matrix, may be determined from the number of adjacent symbols that are expected to contribute to ISI corruption.

In such an embodiment, the reliability factor R also may be calculated from values of the rescattered samples $y_n$. The evaluation of Equations 7 to 9 may be carried out as follows:

$$R(x_n) = \sum_{\substack{i=-K_1 \\ i \neq 0}}^{K_2} |y_{n-i}| \cdot c_i, \tag{14}$$

$$R(x_n) = \sum_{i=1}^{K_2} |y_{n-i}| \cdot c_i, \text{ and} \tag{15}$$

$$R(x_n) = \sum_{\substack{i=-K_1 \\ i \neq 0}}^{K_2} \sqrt{y_{1_{n-i}}^2 + y_{2_{n-i}}^2} \cdot c_i \tag{16}$$

respectively. In Equation 16, the parameters $y_{1_{n-1}}$ and $y_{2_{n-1}}$ respectively may represent values of $y_{n-1}$ in first and second dimensions. Weighting during ISI estimation also may be based on reliability factors calculated from rescattered samples $y_n$.

In an embodiment the subtractive equalizer 680 may be used for a feedback filter in a decision feedback equalizer (DFE).

Symbol Detection Using Maximum Likelihood

In other embodiments, a symbol decoder 210 (FIG. 2) may operate according to the well-known maximum likelihood estimation framework. The captured sample $x_n$ may be given by Equation 2 above:

$$x_n = d_n + \sum_{\substack{i=-K_1 \\ i \neq 0}}^{K_2} a_i \cdot d_{n-i} + \omega_n \tag{17}$$

The maximum likelihood estimate of the transmitted signals $\{d_n\}$ conditioned on the observations $\{x_n\}$ may be given by maximizing the likelihood of the observations. This is simply the conditional probability of the captured sample $x_n$ conditioned on knowing the past transmitted signals $\{h_n^k\}$ and the ISI coefficients $\{a_i\}$:

$$\hat{d}_n^{ML} = \{h_n^k : \max Pr(x_n|a_i) i \in [-K_1, K_2], i \neq 0; h_n^k \in D)\} \tag{18}$$

Finding the maximum likelihood estimate of the present transmitted signal $d_n$ depends upon knowledge of both the past transmitted signals and the ISI coefficients $\{a_n\}$. The probability density function of $x_n$ given $\{d_n\}$ and $\{a_i\}$ is simply the probability density function of the noise $\omega_n$ evaluated at:

$$\omega_n = x_n - d_n - \sum_{\substack{i=-K_1 \\ i \neq 0}}^{K_2} a_i d_{n-i} \tag{19}$$

Then, the probability density function of Equation 19 can be expressed in terms of a series of further conditioned probability functions, which leads to:

$$Pr(x_n | h_n^k) = \sum_{h_{n-K_1}} \cdots \sum_{h_1} \sum_{h_{n-1}} \cdots \sum_{h_{n-K_2}} \int_a Pr(x_n, h_{n+K_1}, \ldots, \tag{20}$$

$$h_{n+1}, h_{n-1}, \ldots, h_{n-K_2}, a | h_n^k) da$$

$$= \sum_{D_{n-K_1}^{n-K_2}} \int_a Pr(x_n, D_{n-K_1}^{n-K_2}, a | h_n^k) da$$

where $$\sum_{D_{n-K_1}^{n-K_2}} f(\cdot) = \sum_{h_{n+K_1}^k} \cdots \sum_{h_{n+1}^k} \sum_{h_{n-1}^k} \cdots \sum_{h_{n-K_2}^k} f(\cdot)$$

denotes the whole set of summation of the function, f(.), each summation running over the whole set of possible constellation points, and $D_{n+K_1}^{n-K_2} = \{h_{n+K_1}, \ldots, h_{n+1}, h_{n-1}, \ldots, h_{n-K_2}\}$ denotes the set of the $M^{K_1+K_2}$ possible sequences of possible values for the surrounding symbols.

This technique averages over all possible past transmitted sequences. The technique also renders lack of knowledge of the ISI coefficients inconsequential, assuming, of course, that the probability distribution of the ISI coefficients is known instead. In what follows the ISI distribution is taken to be a uniform distribution The compound probability rule states that $Pr(A,B)=Pr(A|B)Pr(B)$, which after some straightforward manipulation provides the following for Equation 20:

$$Pr(x_n \mid h_n^k) = \sum_{D_{n+K_1}^{n-K_2}} \int_{\underline{a}} Pr(x_n \mid h_n^k, \underline{a}, D_{n+K_1}^{n-K_2}) Pr(\underline{a}) Pr(D_{n+K_1}^{n-K_2}) d\underline{a} \quad (21)$$

where, $Pr(\underline{a})$ is a probability density function (pdf) associated with the ISI coefficients, and $Pr(D_{n+K_1}n-K^2)$ is a pdf associated with the related surrounding symbols set.

Assuming additive white Gaussian noise of zero mean and variance $\sigma^2$, then the standard probability density formula for Gaussian noise may be applied:

$$Pr(x_n \mid h_n^k) = \sum_{D_{n+K_1}^{n-K_2}} \int_{\underline{a}} \frac{1}{\sqrt{2\pi\sigma^2}} e^{-\frac{(x_n - h_n^k)^2}{2\sigma^2}} Pr(\underline{a}) Pr(D_{n+K_1}^{n-K_2}) d\underline{a}. \quad (22)$$

Finally, for the re-scattered received signal:

$$Pr(x_n \mid h_n^k) = \quad (23)$$

$$\sum_{D_{n+K_1}^{n-K_2}} \int_{\underline{a}} \frac{1}{\sqrt{2\pi\sigma^2}} e^{-\frac{\left(x_n - \sum_{\substack{i=-K_1 \\ i \neq 0}}^{K_2} a_i h_{n-i} - h_n^k\right)^2}{2\sigma^2}} Pr(\underline{a}) Pr(D_{n+K_1}^{n-K_2}) d\underline{a}$$

where the decision to the received symbol is carried through:

$$\hat{d}_n = \{h_n^k : \max Pr(x_n \mid h_n^k \in D)\}. \quad (24)$$

Equation 23, called the "average likelihood" estimation of a hypothesis symbol $h^k$ at time n, serves as a basis for decoding symbols. In essence, Equation 23 takes captured signal samples $x_n$ and removes the effects of ISI through re-scattering, accomplished through the second term of the exponential $$\left(-\sum_{\substack{i=-K_1 \\ i \neq 0}}^{K_2} a_i h_{n-i}\right).$$

At a destination, for each sample $x_n$, Equation 23 may be performed for every point $h_n^k$ in the governing constellation. A decoded symbol $\hat{d}_n$ may be estimated as the point $h_n^k$ having the largest probability of occurrence.

The evaluation of Equation 23 is believed to provide near optimal symbol detection when the ISI coefficients and the transmitted data are unknown. However, it is very difficult to implement in a real-time computing device. Accordingly, other embodiments of the present invention are approximations of the evaluation of Equation 23 that are computationally less complex. These embodiments are discussed below.

Symbol Decoding Using Trellis Based Detection

In another embodiment of the symbol decoder 210, when decoding a sample $x_n$, probability estimations generated from the surrounding symbol samples $x_{n-1}$ to $x_{n-N}$ may be used. Thus, probabilities for all possible transmitted symbols, $Pr(x_{n-i}|h_{n-i} \in D), \forall i \in [-K_1, K_2], i \neq 0$, may be stored for the surrounding symbols. Where ISI coefficients are known to be real, these probabilities represent $\sqrt{M}^{K_1+K_2}$ branches in a trellis (i.e. possible combinations of surrounding symbols). For complex ISI coefficients, the trellis may include $M^{K_1+K_2}$ branches. The probability of an $m^{th}$ branch in the trellis $Dn+K_1^{n-K_2}$ may be represented as:

$$\prod_{\substack{i=-K_1 \\ i \neq 0}}^{K_2} Pr(x_{n-i} \mid h_{n-i}) \quad (25)$$

More conveniently, the calculation may be evaluated for the logarithm of the probabilities (and later converted back to a probability form), $$\sum_{\substack{i=-K_1 \\ i \neq 0}}^{K_2} \log(Pr(x_{n-i} \mid h_{n-i})) \quad (26)$$

Either of these results may be used with a trellis decoder to obtain the likelihood-based estimate for $\hat{d}_n$ according to Equation 23.

Symbol Decoding Using ISI Coefficient Statistics

Statistical distributions of the ISI coefficients may yield further computational simplifications according to an embodiment of the symbol decoder 210. Unless otherwise known, in this embodiment, the ISI coefficients may be considered to be uniform over their specified ranges $\{a_{-K_1}^R, \ldots, a_{-1}^R, a_1^R, \ldots, a_{K_2}^R\}$. In this case, Equation 23 becomes:

$$Pr(x_n \mid h_n^k) = \prod_{\substack{i=-K_1 \\ i \neq 0}}^{K_2} \left(\frac{1}{a_i^R}\right) \times \quad (27)$$

$$\sum_{D_{n+K_1}^{n-K_2}} \int_{\underline{a}} \frac{1}{\sqrt{2\pi\sigma^2}} e^{-\frac{\left(x_n - \sum_{\substack{i=-K_1 \\ i \neq 0}}^{K_2} a_i h_{n-i} - h_n^k\right)^2}{2\sigma^2}} Pr(D_{n+K_1}^{n-K_2}) d\underline{a}.$$

Since the constant $$\prod_{\substack{i=-K_1 \\ i \neq 0}}^{K_2} \left(\frac{1}{a_i^R}\right)$$

is independent of $h_n^k$, it may be omitted from calculation.

Symbol Decoding Using Past Decisions

In the embodiments discussed previously, $Pr(D_{n+K_1}^{n+K_2})$ represents the probability of the various possible symbol sequences that can result in the observed sample $x_n$. The symbol decoder 210 embodiments discussed previously rely upon a maximum likelihood—when considering a sample at time n, each of the symbols $\hat{d}_{n-i}$ were generated from the maximum probabilities at the previous iterations. In an embodiment in which $K_1$ is not equal to zero but where its contributions may be neglected; rather than calculate $Pr(D_{n+K_1}^{n-K_2})$ anew for each sample $x_n$, the most likely symbol sequence may be assumed to be symbol sequence $\hat{D}n-1^{n-K_2}$ that includes the previously estimated symbols $\hat{D}=\{\hat{d}_{n-1}, \ldots, \hat{d}_{n-K_2}\}$ that is, it may be assumed that $Pr(D_{n-1}^{n-K_2}=\hat{D}_{n-1}^{n-K_2})=1$. Therefore, Equation 27 may be simplified further:

$$Pr(x_n | h_n^k) \approx \prod_{i=1}^{K_2} \left(\frac{1}{a_i^R}\right) \times \int_a \frac{1}{\sqrt{2\pi\sigma^2}} e^{-\frac{(x_n - \sum_{i=1}^{K_2} a_i \hat{d}_{n-i} - h_n^k)^2}{2\sigma^2}} da. \quad (28)$$

Again, the constant $$\prod_{i=1}^{K_2} \left(\frac{1}{a_i^R}\right)$$

is independent of $h_n^k$ and may be omitted from calculation.

Eliminating ISI Ranges in Symbol Decoding

Another embodiment of the symbol decoder 210 simplifies the evaluation of Equation 23 by using the estimate of the ISI coefficients, $\hat{a}_i$. In this embodiment, symbol estimation may occur according to maximum likelihood estimation of:

$$\eta(x_n | h_n^k) = x_n - \sum_{i=1}^{K_2} \hat{a}_i \hat{d}_{n-i} - h_n^k \quad (29)$$

Because of the minus sign in the argument of Equation 29, the estimation may become a minimum likelihood analysis:

$$\hat{d}_n = \{h_n^k : \min \eta(x_n | h_n^k \epsilon D)\}. \quad (30)$$

It can be observed that this is in fact the subtractive equalizer discussed in Paragraphs 41–44

Using 'Reliable Symbols' for Estimation

According to an embodiment, identification of a reliable symbol may be made based upon re-scattered symbols $y_n$ rather than the captured samples $x_n$. During operation of the equalizer 200, after an arbitrary number of iterations, the equalizer 200 may produce a set of ISI coefficient estimates, $\hat{a}_i$, each with an associated error, $\tilde{a}_i$, such that, $$\hat{a}_i = a_i + \tilde{a}_i. \quad (31)$$

The partially equalized signal may be written as:

$$y_n = x_n - \sum_{\substack{i=-K_1 \\ i \neq 0}}^{K_2} \hat{a}_i \hat{d}_{n-i}. \quad (32)$$

Substituting into Equation 2 yields.

$$y_n = d_n + \sum_{\substack{i=-K_1 \\ i \neq 0}}^{K_2} (a_i - \hat{a}_i)\hat{d}_{n-i} + \sum_{\substack{i=-K_1 \\ i \neq 0}}^{K_2} (d_{n-i} - \hat{d}_{n-i})a_i + \omega_n, \quad (33)$$

which by examining Equation (28) and defining the error of the estimated symbol as $\hat{d}_i = d_i + \tilde{d}_i$, Equation (30) becomes, $$Y_n = d_n - \sum_{\substack{i=-K_1 \\ i \neq 0}}^{K_2} \tilde{a}_i d_{n-i} - \sum_{\substack{i=-K_1 \\ i \neq 0}}^{K_2} a_i \tilde{d}_{n-i} + \omega_n \quad (34)$$

This is a generalization of Equation 2, where the ISI estimates are completely unknown, so that $\hat{y}_n = y'_n$ and $\tilde{a}_i = -a_i$.

From Equation 34, the residual ISI on the partially equalized symbol point, $y_n$, becomes the inner product of the surrounding data symbols with the ISI error coefficients, $\tilde{a}_i$, and an additional inner product of the decision errors and the ISI coefficients. Since the ISI error coefficients are smaller then the ISI coefficients, surrounding symbols with higher energy will contribute less to the ISI than they would under the structure of Equation 2. Thus, the probability of identifying a sample as a reliable symbol increases, even though the energies of surrounding symbols can be large. As the quality of the estimate increases, the inner product $$\sum_{\substack{i=-K_1 \\ i \neq 0}}^{K_2} \tilde{a}_i d_{n-i}$$

will remain acceptably low even for surrounding symbols of relatively high energy.

Figure 5:
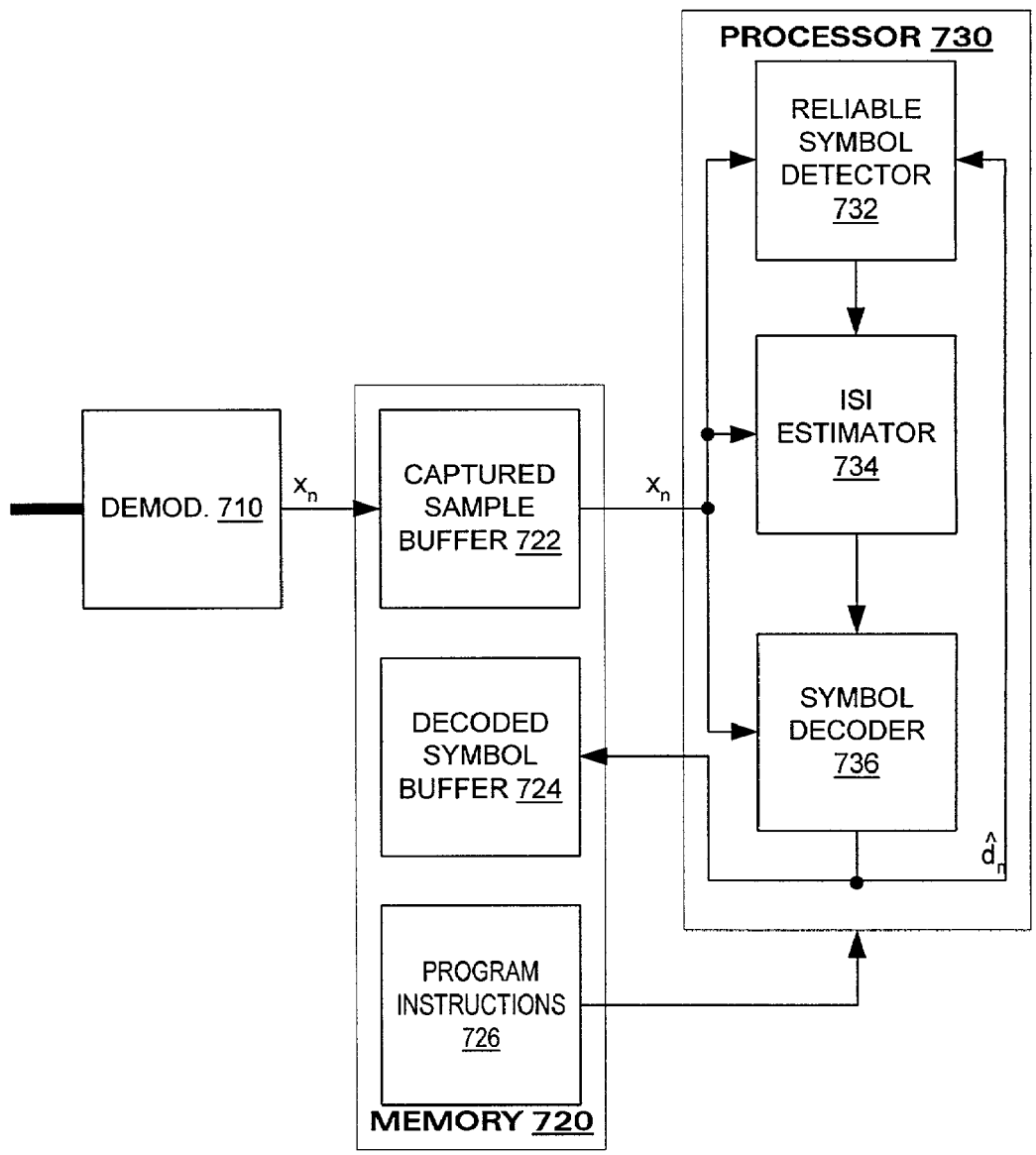
FIG. 5 is a block diagram of a receiver structure according to an embodiment of the present invention.

FIG. 5 is a block diagram of a receiver structure 700 according to an embodiment of the present invention. The receiver 700 may include a demodulator 710, a memory 720 and a processor 730. FIG. 5 illustrates communication flow among the demodulator 710, the memory 720 and the processor 730, not actual electrical interconnections among these units.

The demodulator 710 may capture a signal from a channel and from which, captured samples $x_n$ may be generated. The channel may be an electric, magnetic, optical or acoustic propagation medium. Demodulators 710 for capturing such signals are well known. The captured samples typically have no detectable correspondence to points of the governing constellation. They may take any number of values between the constellation points (e.g. 6.3, 6.5, −3.1). Captured sample data may be stored in a buffer 722 in the memory 720.

The memory system 720 may be logically organized to perform storage functions for the receiver 700 to operate as an equalizer. A first area 722 of the memory may store captured samples $x_n$ for further processing. This area 722 may constitute the frame buffers 240, 640 described with reference to FIGS. 2 and 4. Of course, the area 722 may be provisioned to be much larger than the frame sizes if it is desired to re-estimate samples from the early frames after ISI convergence as described in FIG. 4. A second area 724 of the memory 720 may store the decoded symbols $\hat{d}_n$. And, of course, a third area 726 of memory 720 may store program instructions. The memory 720 actually may be an integrated memory system and may be populated by electric, magnetic or optical memories or other storage elements that may be configured as a read-only memory (ROM) or random access memory (RAM).

As dictated by the instructions, processor 730 operation may be divided logically into functional units including a reliable symbol detector 732, a symbol decoder 736 and an ISI estimator 734. The processor 730 may be a general-purpose processor, a digital signal processor or a collection, of processing elements. Alternatively, the functional units 732–736 may be discrete processing circuits of an application specific circuit or other hardware system.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A reliable symbol identification method for use in a communication system for transmitting symbols of a high order constellation comprising:

estimating decoded symbols from a sequence of captured samples representing a communication signal captured at a receiver, calculating a reliability factor of a candidate sample from values of a plurality of estimated symbols in proximity to an estimated symbol that corresponds to the candidate sample, if the reliability factor is less than a predetermined limit, designating the candidate sample as a reliable symbol.

2. The method of claim 1, wherein the reliability factor R of the candidate sample $x_n$ is given by:

$R(x_n) = \sum_{i=-k1, i \neq 0}^{k2} |\hat{d}_{n-i}| c_i$, where $\hat{d}_{n-i}$ is an estimated symbol, $K_1$, $K_2$ are number of estimated symbols adjacent to symbol $\hat{d}_n$, and $c_i$ is a coefficient representing any prior knowledge of intersymbol interference effects.

3. The method of claim 2, wherein $K_1 = 0$.

4. The method of claim 1, wherein the reliability of a two-dimensional candidate sample $x_n$ is given by:

$R(x_n) = \sum_{i=-k1, i \neq 0}^{k2} (\sqrt{\hat{d_1}_{n-i}^2 + \hat{d_2}_{n-i}^2}) c_i$, where $\hat{d_1}_{n-i}$ and $\hat{d_2}_{n-i}$ respectively represent values of an estimated symbol $\hat{d}_{n-i}$ in first and second dimensions, K1, K2 are the number of estimated symbols adjacent to symbol $\hat{d}_n$, and $c_i$ is a coefficient representing any prior knowledge of intersymbol interference effects.

5. The method of claim 1, wherein the estimating comprises:

rescattering the captured samples according to currently known ISI effects, and generating estimated symbols from the rescattered samples according to decision regions of a governing constellation.

6. The method of claim 1, wherein the estimating comprises generating estimated symbols according to a maximum likelihood analysis of conditional probabilities of a captured sample conditioned upon all possible sets of surrounding transmitted symbols and the ranges of all possible ISI coefficients, for all possible values of the captured sample.

7. The method of claim 1, wherein the estimation comprises generating estimated symbols according to trellis decoding based upon all possible sets of surrounding transmitted symbols and the ranges of all possible ISI coefficients, for all possible values of the captured sample.

8. The method of claim 1, wherein the estimating comprises generating estimated symbols according to a maximum likelihood analysis of conditional probabilities of a captured sample conditioned upon all possible sets of surrounding transmitted symbols and the ranges of all possible ISI coefficients, and a uniform distribution of ISI coefficients for all possible values of the captured sample.

9. The method of claim 1, wherein the estimation comprises generating estimated symbols according to a maximum likelihood analysis of conditional probabilities of a captured sample conditioned upon past symbol decisions and the ranges of all possible ISI coefficients, for all possible values of the captured sample.

10. A reliable symbol identification method for use in a communication system for transmitting symbols of a high order constellation comprising:

estimating decoded symbols from a sequence of captured samples representing a communication signal captured at a receiver, calculating a reliability factor of a candidate sample from values of a plurality of decoded symbols in proximity to the candidate sample, if the reliability factor is less than a predetermined limit, designating the candidate sample as a reliable symbol.

11. The method of claim 10, wherein the reliability factor R of the candidate sample $x_n$ is given by:

$R(x_n) = \sum_{i=-k1, i \neq 0}^{k2} |\hat{d}_{n-i}| c_i$, where $\hat{d}_{n-i}$ is a decoded symbol, $K_1$, $K_2$ are number of decoded symbols adjacent to symbol $\hat{d}_n$, and $c_i$ is a coefficient representing any prior knowledge of intersymbol interference effects.

12. The method of claim 11, wherein $K_1 = 0$.

13. The method of claim 10, wherein the reliability of a two-dimensional candidate sample $x_n$ is given by:

$R(x_n) = \sum_{i=-k1, i \neq 0}^{k2} (\sqrt{\hat{d_1}_{n-i}^2 + \hat{d_2}_{n-i}^2}) c_i$, where $\hat{d_1}_{n-i}$ and $\hat{d_2}_{n-i}$ respectively represent values of a decoded symbol $\hat{d}_{n-i}$ in first and second dimensions, K1, K2 are the number of decoded symbols adjacent to symbol $\hat{d}_n$, and $c_i$ is a coefficient representing any prior knowledge of intersymbol interference effects.

14. The method of claim 10, wherein the estimation comprises:

rescattering the captured samples according to currently estimated ISI effects, and generating estimated symbols from the rescattered samples according to decision regions of a governing constellation.

15. The method of claim 10, wherein the estimating comprises generating estimated symbols according to a maximum likelihood analysis of conditional probabilities of a captured sample conditioned upon all possible sets of surrounding transmitted symbols and the ranges of all possible ISI coefficients, for all possible values of the captured sample.

16. The method of claim 10, wherein the estimating comprises generating estimated symbols according to trellis decoding based upon all possible sets of surrounding transmitted symbols and the ranges of all possible ISI coefficients, for all possible values of the captured sample.

17. The method of claim 10, wherein the estimating comprises generating estimated symbols according to a maximum likelihood analysis of conditional probabilities of a captured sample conditioned upon all possible sets of surrounding transmitted symbols and the ranges of all possible ISI coefficients, and a uniform distribution of ISI coefficients for all possible values of the captured sample.

18. The method of claim 10, wherein the estimating comprises generating estimated symbols according to a maximum likelihood analysis of conditional probabilities of a captured sample conditioned upon past symbol decisions and the ranges of all possible ISI coefficients, for all possible values of the captured sample.

19. An equalization method for use in a communication system for transmitting symbols of a high order constellation, comprising:
   estimating decoded symbols from captured samples based on a set of ISI coefficient estimates, the captured samples representing a communication signal captured at a receiver, and
   revising the ISI coefficients based on the decoded symbols and corresponding received sample values, wherein the contribution of each symbol-sample pair is weighted according to reliability factor of the respective captured sample.

20. The equalization method of claim 19, wherein the weighting of a symbol-sample pair comprises:
   comparing the reliability factor of a candidate sample to a threshold, and
   assigning a first weight value to the symbol-sample pair if the reliability factor is less than or equal to the threshold, and
   otherwise, assigning a second weight value to the symbol-sample pair.

21. The equalization method of claim 19, wherein the weighting of a symbol-sample pair is inversely proportional to the reliability factor of the candidate sample.

22. The equalization method of claim 19, wherein the weighting of a candidate sample comprises:
   comparing the reliability factor of the candidate sample to a threshold, and
   assigning a first weight value to the symbol-sample pair if the reliability factor is less than or equal to the threshold, and
   otherwise, assigning a second weight value to the symbol-sample pair, the second weight being inversely proportional to the reliability factor of the candidate sample.

23. The equalization method of claim 19, wherein the reliability factor of a candidate sample $x_n$ is determined from values of neighboring samples.

24. The equalization method of claim 23, wherein the reliability factor R of a candidate sample $x_n$ is given by:

$$R(x_n)=\Sigma_{i=-k1,i\neq 0}^{k2}|x_{n-i}|c_i, \text{ where}$$

$x_{n-i}$ is a value of a surrounding sample,
$K_1$, $K_2$ represent numbers of samples adjacent to sample $x_n$, and $c_i$ is a coefficient representing any prior knowledge of intersymbol interference effects.

25. The equalization method of claim 23, wherein the reliability factor R of a candidate sample $x_n$ is given by:

$$R(x_n)=\Sigma_{i=1}^{k}|x_{n-i}|c_i, \text{ where}$$

$x_{n-i}$ is a value of a surrounding sample, K represents a number of samples neighboring to sample $x_n$, and
$c_i$ is a coefficient representing any prior knowledge of intersymbol interference effects.

26. The equalization method of claim 23, wherein the reliability factor R of a candidate sample $x_n$ is given by:

$$R(x_n)=\Sigma_{i=-k1,i\neq 0}^{k2}(\sqrt{x1_{n-i}^2+x2_{n-i}^2})c_i, \text{ where}$$

$x1_{n-i}$ and $x2_{n-i}$ respectively represent values of a captured sample $x_{n-i}$ in first second dimensions,
$K_1$, $K_2$ represent numbers of samples neighboring to sample $x_n$, and
$c_i$ is a coefficient representing any prior knowledge of intersymbol interference effects.

27. The method of claim 26 where $K_1=0$.

28. The equalization method of claim 19, wherein the reliability factor of a candidate sample $x_n$ is determined from values of estimated symbols $\hat{d}_{n-i}$ neighboring the candidate sample.

29. The equalization method of claim 28, wherein the reliability factor R of a candidate sample $x_n$ is given by:

$$R(x_n)=\Sigma_{i=-k1,i\neq 0}^{k2}|\hat{d}_{n-i}|c_i, \text{ where}$$

$\hat{d}_{n-i}$ is a value of an estimated symbol,
$K_1$, $K_2$ represent numbers of estimated symbols neighboring to symbol $\hat{d}_n$, and
$c_i$ is a coefficient representing any prior knowledge of intersymbol interference effects.

30. The equalization method of claim 29, wherein the reliability factor R of a candidate sample $x_n$ is given by:

$$R(x_n)=\Sigma_{i=1}^{k}|\hat{d}_{n-i}|c_i, \text{ where}$$

$\hat{d}_{n-i}$ is a a value of an estimated symbol,
K represents a number of estimated symbols neighboring to symbol $\hat{d}_n$, and
$c_i$ is a coefficient representing any prior knowledge of intersymbol interference effects.

31. The equalization method of claim 28, wherein the reliability factor R of a candidate sample $x_n$ is given by:

$$R(x_n)=\Sigma_{i=-k1,i\neq 0}^{k2}(\sqrt{\hat{d_1}_{n-1}^2+\hat{d_2}_{n-1}^2})c_i, \text{ where}$$

$\hat{d_1}_{n-i}$ and $\hat{d_2}_{n-i}$ respectively represent values of an estimated symbol $\hat{d}_{n-i}$ in first and second dimensions,
K1, K2 represent the number of estimated symbols neighboring to symbol $\hat{d}_n$, and
$c_i$ is a coefficient representing any prior knowledge of intersymbol interference effects.

32. The method of claim 31 where $K_1=0$.

33. The equalization method of claim 19, wherein the estimating comprises:
   rescattering the captured samples according to the set of ISI coefficient estimates, estimating symbols from the rescattered samples according to decision regions of a governing constellation.

34. The equalization method of claim 33, wherein the reliability factor R of a candidate sample $x_n$ is given by:

$$R(x_n)=\Sigma_{i=-k1,i\neq 0}^{k2}|y_{n-i}|c_i, \text{ where}$$

$y_{n-i}$ is a value of a rescattered sample,
$K_1$, $K_2$ represent numbers of rescattered samples neighboring to rescattered sample $y_n$, and $c_i$ is a coefficient representing any prior knowledge of intersymbol interference effects.

35. The equalization method of claim 33, wherein the reliability factor R of a candidate sample $x_n$ is given by:

$$R(x_n) = \sum_{i=1}^{k} |y_{n-i}| c_i, \text{ where}$$

$y_{n-i}$ is a value of a rescattered sample,

K represents a number of rescattered samples neighboring to rescattered sample $y_n$, and $c_i$ is a coefficient representing any prior knowledge of intersymbol interference effects.

36. The equalization method of claim 33, wherein the reliability factor R of a candidate sample $x_n$ is given by:

$$R(x_n) = \sum_{i=-k1, i \neq 0}^{k2} (\sqrt{y1_{n-i}^2 + y2_{n-i}^2}) c_i, \text{ where}$$

$y1_{n-i}$ and $y2_{n-i}$ respectively represent values of a rescattered sample $y_{n-i}$ in first second dimensions, $K_1$, $K_2$ represent numbers of rescattered samples neighboring to rescattered sample $y_n$, and $c_i$ is a coefficient representing any prior knowledge of intersymbol interference effects.

37. The equalization method of claim 19, wherein the estimation comprises generating decoded symbols according to a computational approximation of:

$$Pr(x_n | h_n^k) = \sum_{D(n+k1, n-k2)} \int_a [(1/\sqrt{2\pi\sigma^2}) e^{-(\cdots)^2/2\sigma^2} Pr(a) Pr(D(n+k1, n-k2))] da, \text{ where}$$

$h_n^k$ represents a $k^{th}$ estimate of the captured sample $x_n$, k is an index running from a first value $-K_1$ to a second value $K_2$, and $D(n+k1, n-k2) = \{h_{n+k1}, \ldots h_{n+1}, h_{n-1}, \ldots h_{n-k2}\}$, $\sigma^2$ represents a variance in channel noise, and Pr(a) is a probability density function of the ISI coefficients $a_i$.

38. The equalization method of claim 19, wherein the estimating and the revising operate on captured samples and estimated symbols on a frame-by-frame basis.

39. The equalization method of claim 38, wherein the frames each contain a uniform number of captured samples and estimated symbols.

40. The equalization method of claim 38, further comprising:

designating captured samples as reliable symbols based on the captured samples' reliability factors, and assembling a frame to include a set of captured samples and a set of reliable symbols from a preceding frame.

41. The equalization method of claim 38, further comprising:

designating captured samples as reliable symbols based on the captured samples' reliability factors, and assembling a frame to include a set of captured samples and a set of reliable symbols from multiple preceding frames.

42. The equalization method of claim 38, wherein frame lengths vary according to a regular progression of predetermined lengths.

43. An equalizer for use in a communication system for transmitting symbols of a high order constellation, comprising:

a symbol decoder having a first input for captured samples, a second input for estimated ISI coefficients and an output for estimated symbols, an ISI estimator having a first input coupled to the symbol decoder output, a second input coupled to the first input of the symbol decoder and an output for the estimated ISI coefficients, wherein the ISI estimator estimates ISI coefficients based on the decoded symbols and corresponding received sample values, each symbol-sample pair being weighted according to reliability factor of the respective captured sample.

44. The equalizer of claim 43, wherein the symbol decoder comprises a subtractive equalizer coupled to a decision unit.

45. The equalizer of claim 43, wherein the symbol decoder comprises a maximum likelihood estimator coupled to a decision unit.

46. The equalizer of claim 45, wherein the maximum likelihood analysis is made having assigned a uniform probability distribution for ISI coefficients over their ranges.

47. The equalizer of claim 45, wherein the maximum likelihood analysis is made having assigned previously decoded symbols to occur with probability equal to one.

48. The equalizer of claim 43, wherein the symbol decoder comprises a trellis decoder coupled to a decision unit.

49. The equalizer of claim 43, wherein the symbol decoder generates decoded symbols according to a computational approximation of:

$$Pr(x_n | h_n^k) = \sum_{D(n+k1, n-k2)} \int_a [(1/\sqrt{2\pi\sigma^2}) - e^{-(\cdots)^2/2\sigma^2} Pr(a) Pr(D(n+k1, n-k2))] da, \text{ where}$$

$h_n^k$ represents a $k^{th}$ estimate of the captured sample $x_n$, k is an index running from a first value $-K_1$ to a second value $K_2$, $D(n+k1, n-k2) = \{h_{n+k1}, \ldots h_{n+1}, h_{n-1}, \ldots h_{n-k2}\}$, $\sigma^2$ represents a variance in channel noise, and Pr(a)) is a probability density function of the ISI coefficients $a_i$.

50. The equalizer of claim 43, further comprising a reliable symbol detector having an input coupled to the first input of the symbol decoder and an output that enables the symbol decoder.

51. A receiver for use in a communication system for transmitting symbols of a high order constellation, comprising:

a demodulator to generate captured samples from a communication signal received via a channel, a memory system coupled to the demodulator, the memory system logically organized as a captured sample buffer and a decoded symbol buffer, and a processor coupled to the memory by a communication path, the processor logically organized as a reliable symbol detector, an ISI estimator and a symbol decoder, the reliable symbol detector to identify which of the captured samples are likely to be located within a correct decision region of a constellation notwithstanding ISI effects of the channel, the ISI estimator to estimate the ISI effects based on the symbols so identified by the reliable symbol detector and the symbol decoder to generate decoded symbols from captured samples using estimated ISI effects.

52. The receiver of claim 51, wherein the symbol decoder is embodied as a subtractive equalizer coupled to a decision unit.

53. The receiver of claim 51, wherein the symbol decoder is embodied as a maximum likelihood estimator.

54. The receiver of claim 53, wherein the maximum likelihood estimator assigns a uniform probability distribution for ISI coefficients over their ranges.

55. The receiver of claim 53, wherein the maximum likelihood estimator assigns to occurrence of previously decoded symbols a probability of occurrence equal to one.

56. The receiver of claim 51, wherein the symbol decoder is embodied as a trellis decoder.

57. The receiver of claim 51, wherein the symbol decoder generates decoded symbols according to a computational approximation of:

$$Pr(x_n|h_n^k) = \Sigma_{D(n+k1, n-k2)} \int_a [(1/\sqrt{2\pi\sigma^2})e^{-(\cdots)2/2\sigma^2} Pr(a)Pr(D(n+k1, n-k2))]da, \text{ where}$$

$h_n^k$ represents a $k^{th}$ estimate of the captured sample $x_n$,
k is an index running from a first value $-K_1$ to a second value $K_2$, and
$D(n+k1, n-k2) = \{h_{n+k1}, \ldots h_{n+1}, h_{n-1}, \ldots h_{n-k2}\}$,
$\sigma^2$ represents a variance in channel noise, and
Pr(a) is a probability density function of the ISI coefficients $a_i$.

58. A computer readable medium having instructions stored thereon that, when executed by processing unit, causes a symbol estimation method to be executed in a communication system for transmitting symbols of a high order constellation:
estimating decoded symbols from a sequence of captured samples and a set of estimated ISI coefficients, and
revising the estimated ISI coefficients based on the decoded symbols and corresponding received sample values, wherein a contribution of each symbol-sample pair to the revision is weighted according to reliability factors of the respective captured sample.

59. The medium of claim 58, wherein the weighting of a symbol-sample pair comprises:
comparing the reliability factor of a candidate sample to a threshold, and
assigning a first weight value to the symbol-sample pair if the reliability factor is less than or equal to the threshold, and
otherwise, assigning a second weight value to the symbol-sample pair.

60. The medium of claim 58, wherein the weighting of a symbol-sample pair is inversely proportional to the reliability factor of the candidate sample.

61. The medium of claim 58, wherein the weighting of a candidate sample comprises:
comparing the reliability factor of the candidate sample to a threshold, and
assigning a first weight value to the symbol-sample pair if the reliability factor is less than or equal to the threshold, and
otherwise, assigning a second weight value to the symbol-sample pair, the second weight being is inversely proportional to the reliability factor of the candidate sample.

62. The medium of claim 58, wherein the reliability factor of a candidate sample is determined from values of samples neighboring the candidate sample.

63. The medium of claim 58, wherein the reliability factor of a candidate sample $x_n$ is determined from values of estimated symbols $\hat{d}_{n-i}$ neighboring the $n^{th}$ estimated symbol.

64. The medium of claim 58, wherein the estimating comprises:
rescattering the captured samples according to the set of ISI coefficients, estimating symbols from the rescattered samples according to decision regions of a governing constellation.

65. The medium of claim 58, wherein the estimating comprises:
rescattering the captured samples according to currently known ISI effects, and
generating estimated symbols from the captured samples according to decision regions of a governing constellation.

66. The medium of claim 58, wherein the estimating comprises generating decoded symbols according to a computational approximation of:

$$Pr(x_n|h_n^k) = \Sigma_{D(n+k1,n-k2)} \int_a [(1/\sqrt{2\pi\sigma^2})e^{-(\cdots)2/2\sigma^2} Pr(a) Pr(D(n+k1, n-k2))]da, \text{ where}$$

$h_n^k$ represents a $k^{th}$ estimate of the captured sample $x_n$,
k is an index running from a first value $-K_1$ to a second value $K_2$,
$D(n+k1, n-k2) = \{h_{n+k1}, \ldots h_{n+1}, h_{n-1}, \ldots h_{n-k2}\}$,
$\sigma^2$ represents a variance in channel noise, and
Pr(a) is a probability density function of the ISI coefficients $a_i$.

67. The medium of claim 58, wherein the estimating and the revising operate on frames of captured samples and estimated symbols on a frame-by-frame basis.

68. A framing method for use in a communication system for transmitting symbols of a high order constellation, comprising:
identifying reliable symbols from a first frame of captured samples,
following processing of the first frame, generating a second frame of captured samples, the second frame comprising the reliable symbols from the first frame and a second set of captured samples, wherein the identifying comprises:
estimating decoded symbols from a sequence of captured samples representing a communication signal captured at a receiver,
calculating a reliability factor of a candidate sample from values of a plurality of estimated symbols in proximity to an estimated symbol that corresponds to the candidate sample,
if the reliability factor is less than a predetermined limit, designating the candidate sample as a reliable symbol.

69. The framing method of claim 68, further comprising:
identifying reliable symbols from the second frame of captured samples, and
assembling a third frame from a third set of captured samples and the reliable symbols from the second frame.

70. The framing method of claim 69, wherein the third set also includes reliable symbols from the third frame.

* * * * *

UNITED STATES PATENT AND TRADEMARK OFFICE
CERTIFICATE OF CORRECTION

| | |
|---|---|
| PATENT NO. | : 7,110,923 B2 |
| APPLICATION NO. | : 09/899843 |
| DATED | : September 19, 2006 |
| INVENTOR(S) | : Eilon Riess et al. |

Page 1 of 1

It is certified that error appears in the above-identified patent and that said Letters Patent is hereby corrected as shown below:

Column      Line

18              35      Change the dependency of claim 30 from "claim 29" to --claim 28--.

Signed and Sealed this

Seventh Day of August, 2007

JON W. DUDAS
*Director of the United States Patent and Trademark Office*